United States Patent
Oshino et al.

(10) Patent No.: US 9,329,891 B2
(45) Date of Patent: May 3, 2016

(54) COMMUNICATION APPARATUS AND COMMUNICATION METHOD

(71) Applicant: FUJITSU LIMITED, Kawasaki-shi, Kanagawa (JP)

(72) Inventors: Hitoshi Oshino, Sapporo (JP); Makoto Shinohara, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 14/155,830

(22) Filed: Jan. 15, 2014

(65) Prior Publication Data
US 2014/0282554 A1 Sep. 18, 2014

(30) Foreign Application Priority Data
Mar. 18, 2013 (JP) .................................. 2013-055652

(51) Int. Cl.
*G06F 13/24* (2006.01)
*G06F 1/08* (2006.01)
*G06F 1/26* (2006.01)
*G06F 9/48* (2006.01)
*H04W 52/02* (2009.01)

(52) U.S. Cl.
CPC ............. *G06F 9/48* (2013.01); *H04W 52/0251* (2013.01); *Y02B 60/50* (2013.01)

(58) Field of Classification Search
CPC ....... G06F 9/48; G06F 1/3203; G06F 1/3287; G06F 1/324; G06F 1/3296; H04W 52/0251
See application file for complete search history.

(56) References Cited

U.S. PATENT DOCUMENTS

| | | | | |
|---|---|---|---|---|
| 8,055,828 | B2* | 11/2011 | Conti | G06F 13/24 710/267 |
| 8,069,290 | B2* | 11/2011 | Conti | G06F 13/24 710/261 |
| 8,327,158 | B2* | 12/2012 | Titiano | G06F 1/3203 713/300 |
| 8,775,839 | B2* | 7/2014 | Cousson | G06F 1/3203 713/322 |
| 8,912,730 | B2* | 12/2014 | Nakajo | H05B 37/02 315/149 |
| 2008/0031279 | A1 | 2/2008 | Hatakeyama et al. | |
| 2008/0162969 | A1* | 7/2008 | Royannez et al. ............ | 713/323 |
| 2009/0156261 | A1 | 6/2009 | Nakamura et al. | |

(Continued)

FOREIGN PATENT DOCUMENTS

| | | |
|---|---|---|
| JP | 2003-244316 | 8/2003 |
| JP | 2008-59577 | 3/2008 |
| JP | 2009-147661 | 7/2009 |

OTHER PUBLICATIONS

Siekkinen et al., Streaming over 3G and LTE: how to save smartphone energy in radio access network-friendly way, Feb. 2013, 6 pages.*

(Continued)

*Primary Examiner* — Thuy Dao
(74) *Attorney, Agent, or Firm* — Fujitsu Patent Center (57) ABSTRACT

In a communication apparatus, a communication processor rebuilds, with switching of communication systems, a communication bearer to perform communication. An application processor outputs, when background communication occurs or a display unit is shifted from an off state to an on state while notification from the communication processor is stopped, a request signal to the communication processor. The application processor starts the background communication based on information of a latest communication bearer output from the communication processor in response to the request signal.

4 Claims, 5 Drawing Sheets

(56) References Cited

U.S. PATENT DOCUMENTS

2010/0122008 A1* 5/2010 Goss .................... G06F 1/3203
 710/264
2010/0167787 A1* 7/2010 Weisbrod .......... H04M 1/72544
 455/566

OTHER PUBLICATIONS

Zhang et al., Accurate online power estimation and automatic battery behavior based power model generation for smartphones, 2010, 10 pages.*
Zeng et al., SOFA: A Sleep-Optimal Fair-Attention Scheduler for the Power-Saving Mode of WLANs, 2011, 12 pages.*

* cited by examiner

COMMUNICATION APPARATUS AND COMMUNICATION METHOD

CROSS-REFERENCE TO RELATED APPLICATION(S)

This application is based upon and claims the benefit of priority of the prior Japanese Patent Application No. 2013-055652, filed on Mar. 18, 2013, the entire contents of which are incorporated herein by reference.

FIELD

The embodiments discussed herein are directed to a communication apparatus and a communication method.

BACKGROUND

Recently, with the increase of an data amount transmitted in accordance with the development of multimedia services, a packet communication system with a high communication speed has been developed. One of the examples is a system corresponding to a third generation partnership project radio access network long term evolution (3GPP LTE) that is a communication standard.

Currently, there are a plurality of communication networks. Thus, there is provided a multi-communication apparatus configured to perform communication using a plurality of communication systems corresponding to respective communication networks. The communication systems are exemplified by the above LTE system and third generation (3G) system, for example.

Some multi-communication apparatuses have a plurality of processors including a communication processor such as a communication central processing unit (CCPU) and an application processor such as an application central processing unit (ACPU), for example. When the multi-communication apparatus having a plurality of processors is switched from a first communication system to a second communication system, the communication processor first rebuilds a communication bearer from a first communication bearer corresponding to the first communication system to a second communication bearer corresponding to the second communication system. Then, the communication processor notifies, using a notification channel, the application processor of information of the rebuilt second communication bearer. Thereafter, the application processor reestablishes, using the information communicated by the communication processor, a connection between the processors from a first connection corresponding to the first communication bearer to a second connection corresponding to the second communication bearer. In this manner, it is possible to establish a connection corresponding to the communication bearer after rebuilding between the application processor and the communication processor, thus enabling communication in the second communication system. Here, the notification channel is a channel used for communicating control information between processors.

Recently, in mobile network services, what is called background communication has been performed. The background communication is a communication performed mainly by an application even without any user's operation, for example.

Conventionally, there is disclosed a technique of stopping notification from the communication processor to the application processor when a display screen is off. Thus, it is possible to stop notification processing while a user does not perform any operation, which can decrease power consumption of the communication processor and the application processor. A conventional example is described in Japanese Laid-open Patent Publication No. 2003-244316.

However, in case of the conventional technique, it is possible that when a request for background communication occurs while notification through the notification channel is stopped, the background communication cannot be performed. That is, while notification through the notification channel is stopped, the application processor cannot recognize such a fact, even when a communication bearer has been rebuilt. Consequently, the application processor tries background communication using a connection corresponding to a communication bearer before rebuilding. However, the communication bearer before rebuilding is already deleted and, as a result, the background communication cannot be performed.

When notification through the notification channel is not stopped, both the communication processor and the application processor operate constantly, which increases power consumption thereof.

SUMMARY

In the aspects disclosed herein, when background communication occurs while notification from the first processor is stopped, the second processor outputs a request signal to the first processor, and starts the background communication based on the information of a latest communication bearer output from the first processor in response to the request signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the embodiments do not limit the communication apparatus and the communication method disclosed in the application. Moreover, components having the same function in the embodiments are represented with the same symbol, and the overlapped explanation thereof is omitted. Moreover, the same processing steps in the embodiments are represented with the same symbol, and the overlapped explanation thereof is omitted.

[a] First Embodiment

Configuration Example of Communication Apparatus

Figure 1:
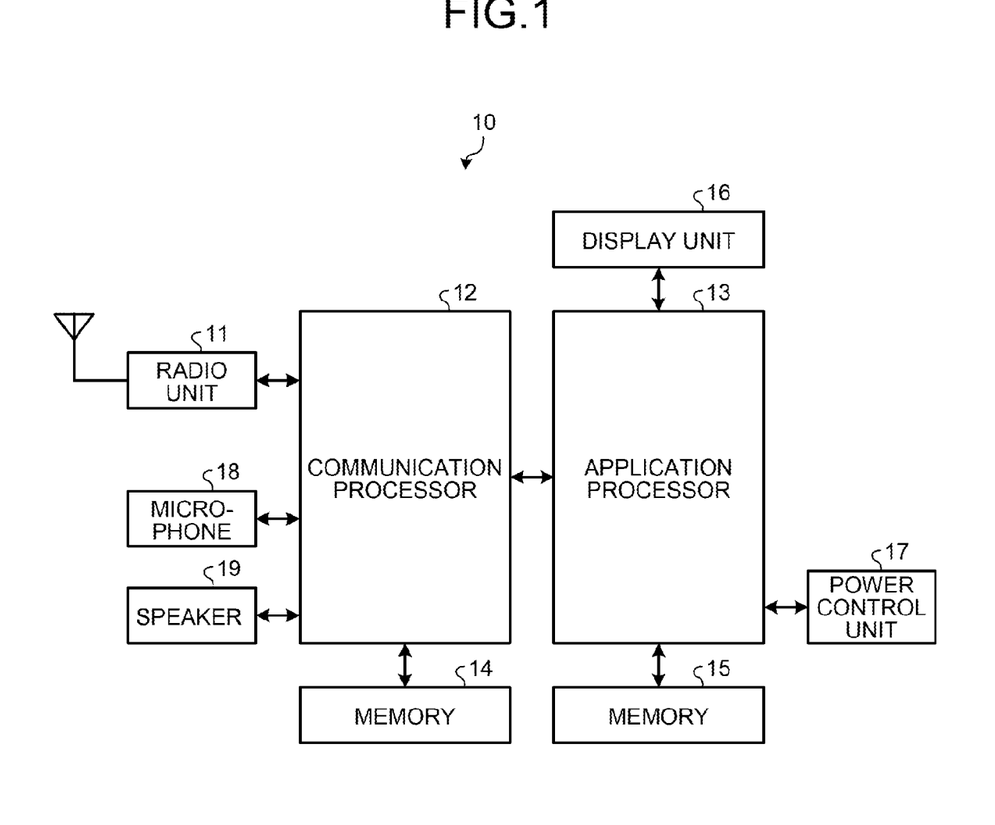
FIG. 1 is a block diagram illustrating an example of a communication apparatus of a first embodiment.

FIG. 1 is a block diagram illustrating an example of a communication apparatus of a first embodiment. In FIG. 1, a communication apparatus 10 has a radio unit 11, a communication processor 12, an application processor 13, memories 14 and 15, a display unit 16, a power control unit 17, a microphone 18, and a speaker 19. The communication apparatus 10 is configured to perform communication in any one of a plurality of communication systems. The communication systems may include the above LTE system and 3G system, for example. Moreover, the communication processor 12 is a CCPU, for example. The application processor 13 is an ACPU, for example. Furthermore, the communication processor 12 and the application processor 13 may be referred to as a first processor and a second processor, respectively.

The communication processor 12 performs communication system switching processing. For example, when the communication apparatus 10 moves and leaves a service area corresponding to a first communication system and enters a service area corresponding to a second communication system, the communication processor 12 switches a communication system set at the radio unit 11 from the first communication system to the second communication system. That is, the communication processor 12 rebuilds a communication bearer from a first communication bearer to a second communication bearer. Here, the communication bearer may be referred to as a communication line and service, etc.

The communication processor 12 stops notification to the application processor 13 through the notification channel in a "notification stopped state". The notification using the notification channel includes periodic notification including radio wave intensity information corresponding to each communication system, notification including information of a latest bearer (hereinafter, referred to as merely "latest bearer information") that is performed when the communication systems are switched, etc. Moreover, when the communication processor 12 receives a notification stop instruction from the application processor 13 through the notification channel, it shifts from a "notification execution state" to the "notification stopped state".

When the communication processor 12 receives "request signals" from the application processor 13 through the notification channel, it shifts from the "notification stopped state" to the "notification execution state". To be more specific, when the communication processor 12 receives "request signals" from the application processor 13 through the notification channel, it first notifies the application processor 13 of latest bearer information through the communication channel. Then, the communication processor 12 also starts periodic notification including radio wave intensity information corresponding to each communication system.

The memory 14 stores various programs and various kinds of data used by the communication processor 12. The communication processor 12 reads out the programs stored in the memory 14 and executes them, thereby achieving various kinds of processing.

When the display unit 16 is turned off, the application processor 13 outputs a notification stop instruction to the communication processor 12, and the application processor 13 itself shifts from an on state to an off state. In this manner, notification by the communication processor 12 is stopped, which can reduce power consumption of the communication processor 12 and the application processor 13.

The application processor 13 receives, in the off state, an on-instruction from the power control unit 17 in a given cycle, and shifts to the on state in response to the on-instruction. In the on state, the application processor 13 determines whether a request for background communication occurs. When a request for background communication occurs, the application processor 13 outputs "request signals" to the communication processor 12 through the notification channel. In response to the request signals, the communication processor 12 shifts to the notification execution state. Thus, the application processor 13 can receive latest bearer information. That is, the application processor 13 can receive information of a latest bearer even when a communication bearer has been rebuilt while the application processor 13 is off. Then, the application processor 13 establishes a connection corresponding to the latest communication bearer based on the received latest bearer information. In this manner, it is possible to establish a connection without any discordance with the latest communication bearer, and thus to ensure background communication using the latest communication bearer.

When signals are not transmitted during a certain period of time in background communication that has been started, the application processor 13 outputs a notification stop instruction to the communication processor 12, and the application processor 13 itself shifts from the on state to the off state.

Also when the display unit 16 is shifted from the off state to the on state, the application processor 13 may perform processing operation in the same manner as when background communication occurs. That is, it is possible that the application processor 13 outputs a notification stop instruction to the communication processor 12 and the application processor 13 itself shifts from the on state to the off state.

The memory 15 stores various programs and various kinds of data used by the application processor 13. The application processor 13 reads out the programs stored in the memory 15 and executes them, thereby achieving various kinds of processing.

The display unit 16 is an output interface displaying various kinds of information on a screen. For example, the display unit 16 receives, in the on state, radio wave intensity information from the communication processor 12 through the application processor 13, and displays an antenna in accordance with the intensity indicated by the radio wave intensity information. Thus, a user can confirm radio wave environments.

The microphone 18 is an input interface collecting various kinds of voice. The speaker 19 is an output interface acoustically outputting various kinds of voice.

Operation Example of Communication Apparatus

Figure 2:
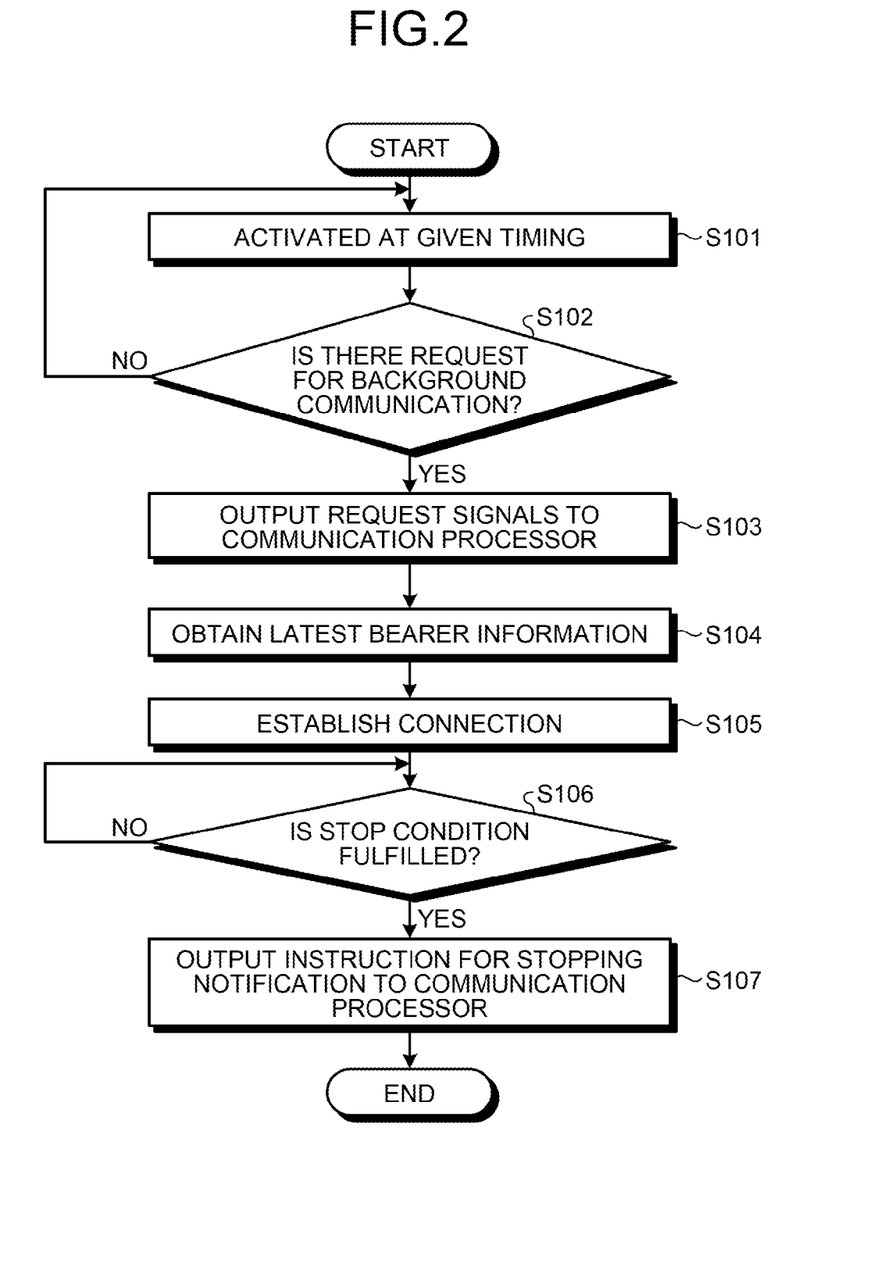
FIG. 2 is a flowchart illustrating an example of processing operations of the communication apparatus of the first embodiment.
Figure 3:
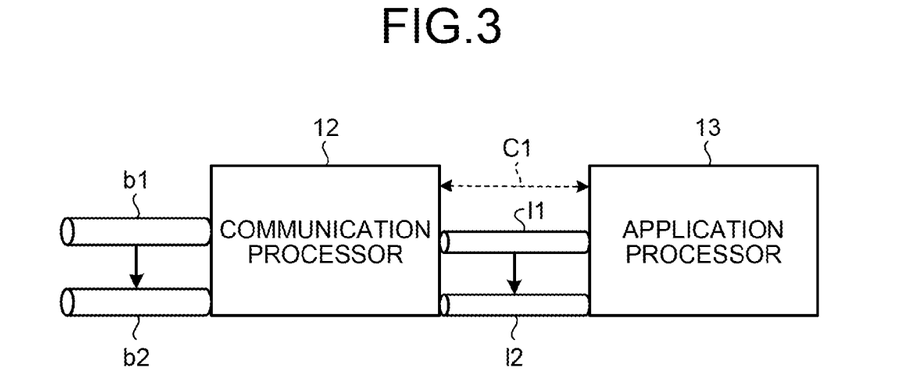
FIG. 3 is a diagram used for explaining an example of processing operations of the communication apparatus of the first embodiment.

The processing operations of the communication apparatus 10 having the above configuration are described. FIG. 2 is a flowchart illustrating an example of processing operations of the communication apparatus of the first embodiment. FIG. 3 is a diagram used for explaining an example of processing operations of the communication apparatus of the first embodiment.

First, it is supposed that the display unit 16 of the communication apparatus 10 is off. In such a state, notification by the communication processor 12 using a communication channel C1 illustrated in FIG. 3 is stopped. The application processor 13 is also off. Moreover, it is supposed that in the "notification stop state", that is, while the application processor 13 is off, a communication bearer has been rebuilt from a communication bearer b1 to a communication bearer b2.

The application processor 13 is activated when it receives, in the off state, an on-instruction from the power control unit 17 (Step S101), and shifts to the on state.

The application processor 13 determines whether there is a request for background communication from an application (Step S102). When there is no request (No at Step S102), the application processor 13 returns to the off state, and waits for the next on-instruction from the power control unit 17.

When there is a request (Yes at Step S102), the application processor 13 outputs request signals to the communication processor 12 through the notification channel (Step S103). Thus, the communication processor 12 shifts to the communication execution state, and starts notification through the notification channel. That is, when the communication processor 12 receives the request signals, it notifies the application processor 13 of latest bearer information. When the communication processor 12 receives request signals and a communication bearer has been rebuilt, it notifies the application processor 13 of latest bearer information each time, and notifies the application processor 13 of radio wave intensity information in a given cycle.

The application processor 13 obtains the latest bearer information output from the communication processor 12 (Step S104). The latest bearer information is information of the communication bearer b2 after rebuilding.

The application processor 13 establishes a connection corresponding to the latest communication bearer with the communication processor 12 based on the obtained latest bearer information (Step S105). That is, the application processor 13 deletes a connection 11 corresponding to the communication bearer b1 before rebuilding, and establishes a connection 12 corresponding to the communication bearer b2 after rebuilding. In this manner, the application processor 13 can establish a connection without any discordance with the latest communication bearer with the communication processor 12.

The application processor 13 determines whether a stop condition is fulfilled (Step S106). The stop condition is a condition that no signal is transmitted during a given period of time in background communication that has been started, for example. The determination processing is performed repeatedly until the stop condition is fulfilled (No at Step S106).

When the stop condition is fulfilled (Yes at Step S106), the application processor 13 outputs a notification stop instruction to the communication processor 12 (Step S107), and the application processor 13 itself shifts from the on state to the off state.

Figure 4:
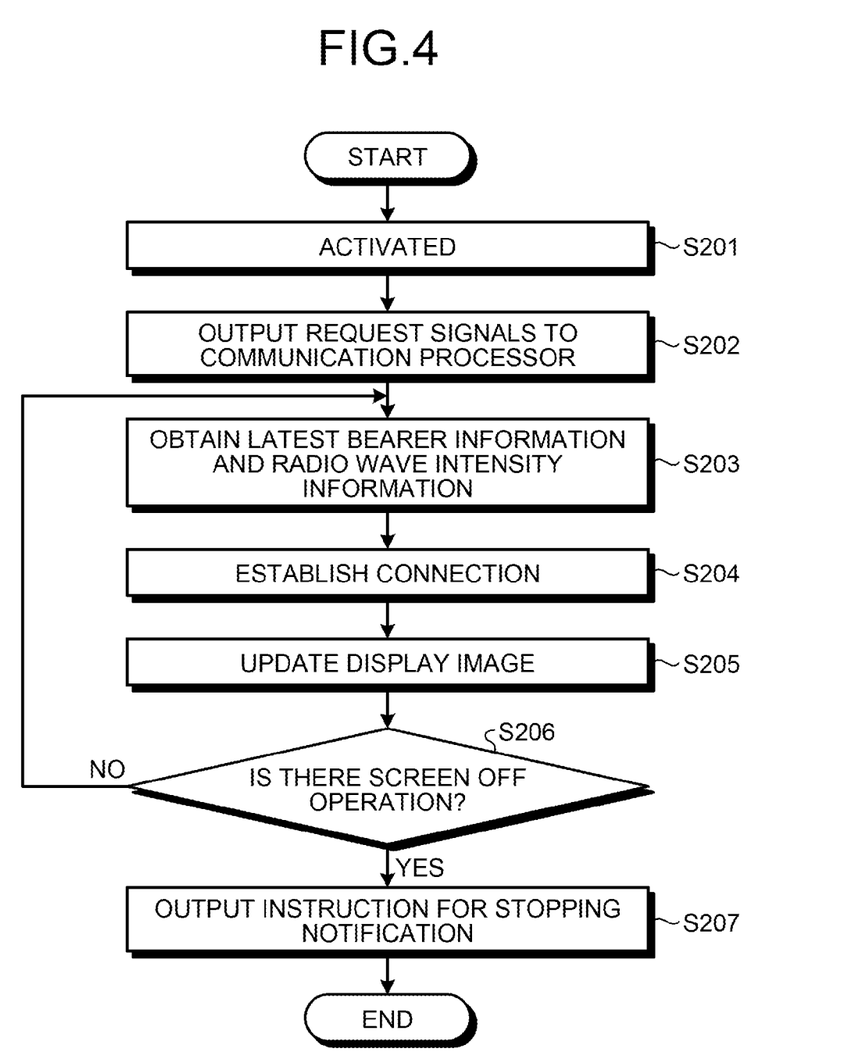
FIG. 4 is a flowchart illustrating another example of processing operations of the communication apparatus of the first embodiment.

Note that when the display unit 16 is shifted from the off state to the on state, the following processing operations may be performed. FIG. 4 is a flowchart illustrating another example of processing operations of the communication apparatus of the first embodiment.

The application processor 13 is activated when the display unit 16 is shifted from the off state to the on state (Step S201), and shifts to the on state.

The application processor 13 outputs request signals to the communication processor 12 using the notification channel (Step S202). Thus, the communication processor 12 shifts to the notification execution state, and starts notification through the notification channel.

The application processor 13 obtains latest bearer information and radio wave intensity information that are output from the communication processor 12 (Step S203).

The application processor 13 establishes a connection corresponding to the latest communication bearer with the communication processor 12 based on the obtained latest bearer information (Step S204).

The application processor 13 updates a display image on the display unit 16 based on the obtained radio wave intensity information (Step S205).

The application processor 13 determines whether there is a screen off operation (Step S206).

When there is no screen off operation (No at S206), the processing step returns to Step S203, and the application processor 13 waits for the next notification.

When there is a screen off operation (Yes at S206), the application processor 13 outputs a notification stop instruction to the communication processor 12 (Step S207), and the application processor 13 itself shifts from the on state to the off state.

Figure 5:
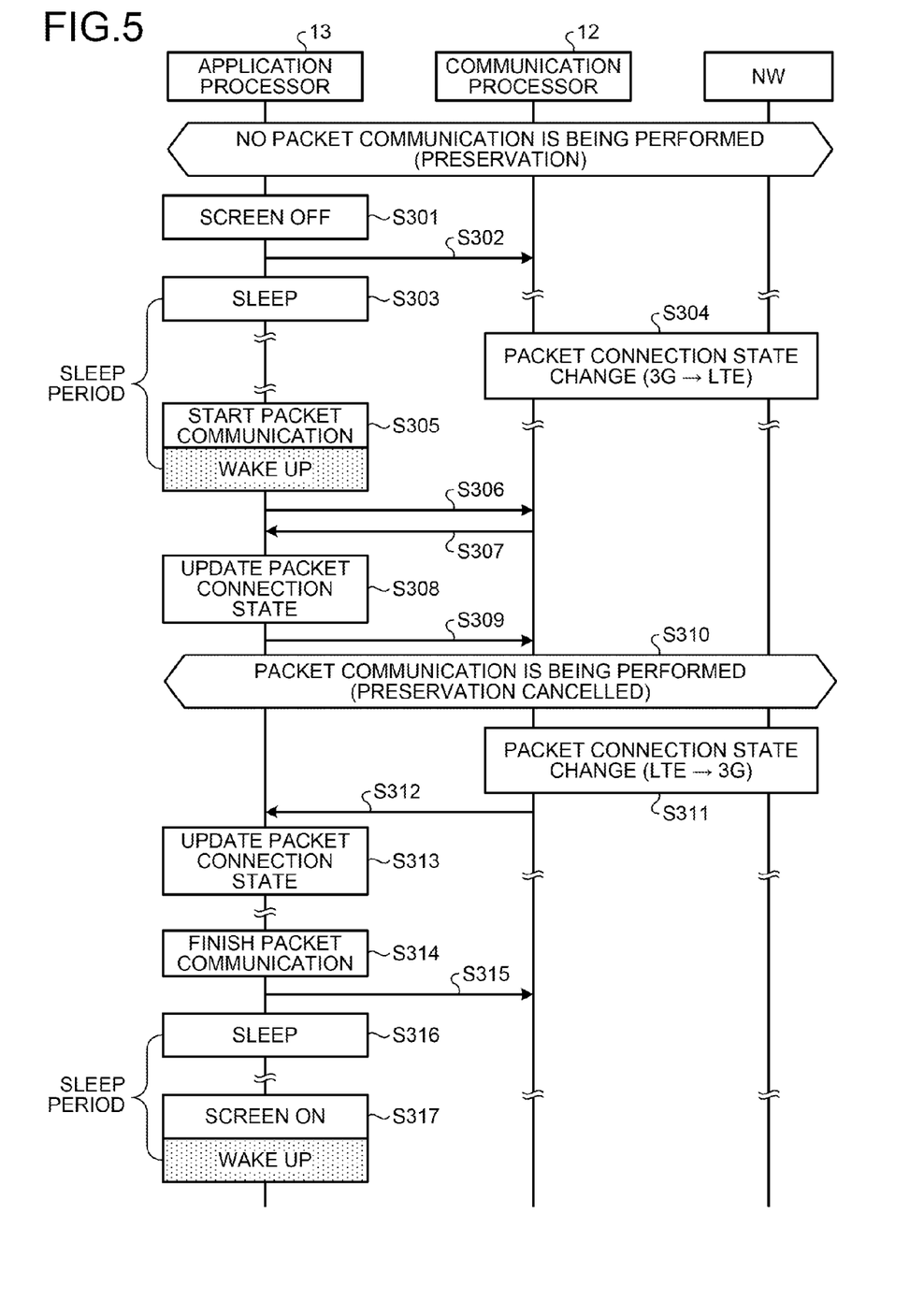
FIG. 5 is a sequence diagram illustrating an example of processing operations of the communication apparatus of the first embodiment.

FIG. 5 is a sequence diagram illustrating an example of processing operations of the communication apparatus of the first embodiment. Note that a case in which a plurality of communication systems are a 3G system and an LTE system is described here as an example. In FIG. 5, NW represents a network, that is, it indicates a 3G network and an LTE network.

When the screen (that is, the display unit 16) is turned off (Step S301) while the communication between the communication apparatus 10 and the network is not performed, the application processor 13 outputs a notification stop instruction to the communication processor 12 (Step S302). Then, the application processor 13 shifts from the on state to the off state, that is, it shifts to a sleep state (Step S303).

Then, it is supposed that the communication processor 12 has rebuilt a communication bearer from a communication bearer of the 3G system to a communication bearer of the LTE system. That is, it is supposed that the packet connection state between the communication apparatus 10 and the network has been changed (Step S304). Then, it is supposed that the application processor 13 has detected the start of packet communication, that is, background communication (Step S305).

The application processor 13 outputs request signals to the communication processor 12 through the notification channel (Step S306).

When the communication processor 12 receives the request signals, it notifies the application processor 13 of latest bearer information through the communication channel (Step S307).

The application processor 13 establishes a connection, that is, updates a packet connection state based on the received latest bearer information (Step S308).

The application processor 13 transmits a communication packet to the communication processor 12 through the established connection (Step S309). Thereafter, the application processor 13 performs communication with the LTE network through the communication processor 12 (Step S310).

Then, it is supposed that the communication processor 12 has rebuilt a communication bearer from the communication bearer of the LTE system to the communication system of the 3G system. That is, it is supposed that the packet connection state between the communication apparatus 10 and the network has been changed (Step S311).

With the rebuilding of the communication bearer, the communication processor 12 notifies the application processor 13 of latest bearer information (Step S312).

The application processor 13 establishes a connection, that is, updates a packet connection state based on the received latest bearer information (Step S313).

When the packet communication is finished (Step S314), the application processor 13 outputs a notification stop instruction to the communication processor 12 (Step S315). Then, the application processor 13 shifts from the on state to the off state, that is, it shifts to the sleeping state (Step S316).

When the screen (that is, the display unit 16) is turned on in such a state (Step S317), the application processor 13 is activated.

According to the embodiment as described above, in the communication apparatus 10, the communication processor 12 rebuilds, with switching of communication systems, a communication bearer to perform communication. When background communication occurs or when the display unit 16 is shifted from the off state to the on state while notification from the communication processor 12 is stopped, the application processor 13 outputs request signals to the communication processor 12. Then, the application processor 13 starts the background communication based on the information of a latest communication bearer output from the communication processor 12 in response to the request signals.

With such a configuration of the communication apparatus 10, the application processors 13 can obtain information of a latest communication bearer even when a communication bearer has been rebuilt while notification is stopped. Then, the application processor 13 can perform background communication based on the information of the latest communication bearer, and thus the communication can be performed normally with the communication bearer after rebuilding. Moreover, while no background communication occurs or the display unit 16 is off, it is possible to stop notification and keep the application processor 13 off, which can reduce power consumption of the communication apparatus 10.

The communication processor 12 starts notification in response to the request signals, and notifies the application processor 13 of information of the communication bearer after change every time the communication bearer is changed.

With such a configuration of the communication apparatus 10, even when the communication bearer is changed during communication, the application processor 13 can obtain information of a latest communication bearer and perform communication normally with the latest communication bearer.

When the background communication is finished, the application processor 13 outputs a notification stop instruction to the communication processor 12.

With such a configuration of the communication apparatus 10, it is possible to stop notification and keep the application processor 13 off while communication is not performed, which can reduce power consumption of the communication apparatus 10.

[b] Other Embodiments

1. The communication apparatus 10 described in the first embodiment may be a smartphone, a tablet terminal, or an information terminal. In short, the communication apparatus 10 may be any terminal capable of multi-radio communication.

2. Each component of each part illustrated in the first embodiment is not necessarily configured physically as illustrated in the drawings. That is, the concrete form of distribution and integration of each part is not limited to the form illustrated in the drawings, and all or part thereof may be distributed or integrated functionally or physically in an arbitrary unit, depending on various loads, a use state, etc.

Moreover, regarding various processing functions performed in each unit, all or part of them may be performed on a central processing unit (CPU) (or a microcomputer such as a micro processing unit (MPU) and a micro controller unit (MCU)). Furthermore, regarding the various processing functions, all or part of them may be performed on a program analytically executed by the CPU (or a microcomputer such as an MPU and an MCU) or on hardware by the wired logic.

According to the aspects disclosed herein, it is possible to reduce power consumption and perform background communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method used for a communication apparatus including a first processor and a second processor coupled to the first processor, the communication method comprising:
by the first processor, switching a communication bearer used for communication in the communication apparatus from a first communication bearer to a second communication bearer while the second processor is in an off state;
by the second processor, when background communication occurs after the second processor shifts from the off state to an on state, receiving information of the switched second communication bearer from the first processor, and switching a connection between the first processor and the second processor from a first connection to a second connection based on the received information, the first connection corresponding to the first communication bearer, the second connection corresponding to the second communication bearer; and
by the second processor, outputting a control signal for stopping transmission of the information to the first processor when the background communication is finished.

2. A communication apparatus, comprising:
a first processor that rebuilds a communication bearer; and
a second processor coupled to the first processor, wherein
the first processor, in rebuilding of the communication bearer, switches a communication bearer used for communication in the communication apparatus from a first communication bearer to a second communication bearer while the second processor is in an off state, and,
when background communication occurs after the second processor shifts from the off state to an on state, the second processor receives information of the switched second communication bearer from the first processor, and switches a connection between the first processor and the second processor from a first connection to a second connection based on the received information, the first connection corresponding to the first communication bearer, the second connection corresponding to the second communication bearer, wherein
the second processor outputs a control signal for stopping transmission of the information to the first processor when the background communication is finished.

3. The communication apparatus according to claim 2, wherein the first processor transmits the information to the second processor in response to a request signal output from the second processor.

4. The communication apparatus according to claim 3, wherein the second processor outputs, when a display unit is shifted from an off state to an on state, the request signal to the first processor.

* * * * *